Figure 1:
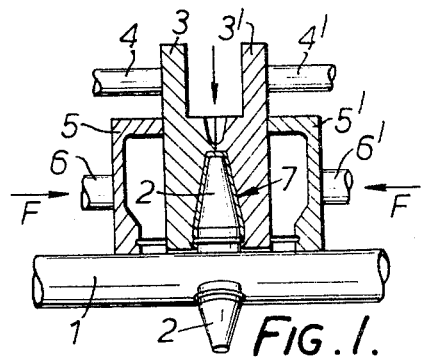

United States Patent [19]
Julien

[11] 3,988,100
[45] Oct. 26, 1976

[54] APPARATUS FOR INJECTION BLOW MOULDING

[75] Inventor: Philippe Julien, Sleidinge, Belgium

[73] Assignee: Albert Aly Kaufman, North Plainfield, N.J.

[22] Filed: Dec. 27, 1974

[21] Appl. No.: 536,794

[30] Foreign Application Priority Data
Jan. 8, 1974  United Kingdom................... 917/74

[52] U.S. Cl.............................. 425/242 B; 264/97; 425/342; 425/387 B; 425/DIG. 209
[51] Int. Cl.²......................................... B29D 23/03
[58] Field of Search............ 425/242 B, 326 B, 129, 425/134, 244, 247, 245, 249, 324 B, DIG. 10, DIG. 209, DIG. 211, 387 B; 264/94, 97

[56] References Cited
UNITED STATES PATENTS
3,776,991  12/1973  Marcus...................... 425/DIG. 209
3,797,983  3/1974  Merz............................... 425/242 B
3,819,313  6/1974  Josephsen et al................... 425/251

*Primary Examiner*—Richard B. Lazarus
*Assistant Examiner*—R. J. Charvat
*Attorney, Agent, or Firm*—Stevens, Davis, Miller & Mosher

[57] ABSTRACT

An injection blow moulding apparatus and method, in which a preform (or "parison") is formed on a blow tube in a preform mould, the preform mould is opened, the blow tube and preform are moved clear of the opened preform mould, a blow mould is closed around the blow tube and preform, and a hollow body is blown in the blow mould and then released, the blow mould parts being continuously around the blow tube and being moved together and apart to close and open the blow mould.

9 Claims, 10 Drawing Figures

APPARATUS FOR INJECTION BLOW MOULDING

This invention relates to an apparatus for, and method of, injection blow moulding.

In conventional injection blow moulding a preform (also known as a "parison"), which is to be subsequently expanded by blowing, is first formed in a preform mould; the preform is then transferred from the preform mould to a blow mould spaced from the preform mould, after which the preform is expanded in the blow mould to produce a hollow body. Previously, one drawback associated with injection blow moulding has been the requirement that the preform has to be transferred from the preform mould to the blow mould.

According to one aspect of the present invention there is provided an apparatus for injection blow moulding, which apparatus includes:

an openable and closable preform mould provided at a first position;

a blow tube and an associated, openable and closable blow mould, the blow tube and associated blow mould being movable together between (a) the first position in which the preform mould is intermediate the blow tube and the open mould and (b) a subsequent position or positions where the blow tube and blow mould are clear of the preform mould;

means for moving the blow tube and associated blow mould from the first position to the subsequent position(s), and then again to the first position;

means for closing the preform mould around the blow tube (when in the first position) and for subsequently opening the preform mould;

means, in the region of the first position, for injecting molten plastics material into the preform mould when closed in the first position around the blow tube; whereby a preform can be formed in the preform mould;

means for closing the blow mould around the blow tube when in a subsequent position, and for subsequently opening the blow mould; and means for blowing a fluid medium via the blow tube into the closed blow mould when in the subsequent position(s), whereby a hollow body can be formed by expansion of the preform.

The blow tube forming part of the apparatus of the present invention can be of any convenient shape or configuration; it serves as the member around which the preform is formed; the blow tube is provided with one or more apertures through which the fluid medium may be passed in order to expand the preform and form the hollow body.

In one embodiment of the apparatus of the present invention, the apparatus includes a plurality of blow tubes, each having an associated blow mould, per one preform mould and per one means (hereinafter referred to as an injection unit) for injecting the molten plastics material.

Although it is possible for the or each blow tube and associated blow mould to oscillate or reciprocate between the first position and the subsequent position(s), it is preferable for the arrangement to be such that the or each blow tube and associated blow mould follow a circuitous path from the first position to the subsequent position(s) and then back a different way to the first position. This arrangement is particularly suitable for the case in which a plurality of blow tubes and their respective blow moulds are carried on a rotatable shaft or turntable which undergoes rotation in one direction only. In one embodiment of such an arrangement the blow tubes can project radially from the rotatable shaft and the associated two-part blow moulds can be opened and closed by moving the blow mould parts in a direction parallel or substantially parallel to the longitudinal axis of the rotatable shaft. In this case the two-part preform mould can be opened and closed by moving the parts of the mould in a direction parallel to the longitudinal axis of the rotational shaft. The injection unit is, in this case, reciprocatable radially with respect to the rotatable shaft.

In an alternative embodiment of such an arrangement, the blow tubes can be disposed parallel to, and displaced from, the axis of rotation. They could be mounted on, for instance, a turntable. With such a disposition of blow tubes, the blow mould can be opened and closed by moving the parts radially with respect to the axis of rotation; similarly the preform mould can be opened and closed by moving the parts of that mould radially with respect to the axis of rotation. In this case the injection unit is reciprocatable along a line of action parallel to the axis of rotation.

In a preferred embodiment of the apparatus of the present invention, means are provided which tend to urge the parts of the preform mould apart, so that unless any other force is effective, the preform mould adopts the open position. In this embodiment preferably the blow mould is used to close the preform mould at the first position; here, when the blow tube and its associated blow mould arrive at the first position, the blow tube moves between the open parts of the preform mould so as to take up the appropriate position which, when the preform mould is closed, will enable the preform to be formed. Upon arrival at the first position, the blow mould is fully open and the blow mould parts move around the outside of the open preform mould parts; then means are actuated which tend to close the blow mould; this causes the blow mould parts to force together the preform mould parts, thereby closing the preform mould. At this stage the blow mould is less widely open than it was when it first arrived at the first position, but it cannot adopt the closed position because of the presence of the now closed preform mould between the blow mould parts and the blow tube. In order to maintain the preform mould in the closed position during injection of the molten plastics materials, the actuation of the means urging together the blow mould parts is maintained.

Once the preform has been produced, the blow mould parts are allowed to move further apart, which allows the preform mould to open. The blow mould is opened sufficiently so that it will be able to clear the now open preform mould when the blow tube, the preform carried by the blow tube, and the blow mould are moved from the first position to the subsequent position(s).

One advantage of this embodiment is that it is possible to dispense with specific means for controllably opening and closing the preform mould and for maintaining the preform mould in the closed position against the pressures present during the injection of the molten plastics material. Thus, it is only necessary to provide appropriate means for controllably opening and closing the blow mould, whereby a saving in cost can be achieved in view of the fact that no such similar equipment is required for opening and closing the preform mould.

Another advantage of the apparatus of the present invention is that the preform is formed in the preform mould around a member which in the blow mould is used for expanding the preform to produce the hollow body. Thus, in the apparatus of the present invention, there is no need to provide equipment for transferring the preform from the member around which it is formed in the preform mould to the blow mould, in view of the fact that the blow tube is within the blow mould (in its open and closed states) all of the time. This is particularly advantageous in the case where within each blow mould there is a plurality of blow tubes; in a conventional apparatus there might be difficulties in locating the preforms accurately in the blow mould, but in the apparatus of the present invention the preforms remain on the blow tubes within the blow mould parts.

Another aspect of the present invention provides a method of injection blow moulding, which comprises a cycle including the following steps:

injecting, at a first position, a molten plastics material around a blow tube positioned in a closed, openable preform mould so as to produce a preform, while a closable blow mould associatable with the blow tube is open and positioned outside the preform mould;

opening the preform mould;

advancing the blow tube, the preform carried by the blow tube, and the open blow mould to a subsequent position, while leaving the preform mould in the first position;

closing the blow mould around the blow tube and the preform;

blowing a fluid medium via the blow tube into the interior of the preform so as to expand the preform into a hollow body;

opening the blow mould and withdrawing therefrom the hollow body;

returning the blow tube and the associated open blow mould to the first position, so that the blow tube is within the open preform mould and the open blow mould is outside the open preform mould; and closing the preform mould around the blow tube with the open blow mould still outside the preform mould.

The method of the present invention can be carried out in any of the embodiments of the apparatus described above. Preferably, however, the preform mould is closed by the action on the preform mould parts of blow mould parts being urged towards each other. Preferably also there is a weak force urging the preform mould parts apart so that, when the blow mould parts are not forcing the preform mould parts together, the preform mould opens of its own accord.

From the point of view of economy, the fluid medium used in the blowing is preferably air under pressure.

Numerous different ways can be adopted for withdrawing the hollow body from the open blow mould. For example, a short burst of fluid medium can be expelled through the blow tube, which forces the hollow body off the blow tube. Alternatively, in an arrangement in which the blow tube is pointing downwardly when the blow mould is open, the force of gravity alone may be sufficient to cause the hollow body to fall off the blow tube and out of the blow mould. The hollow body can, if desired, be withdrawn on a suitable conveyor to a subsequent station, for example a filling and sealing station.

In the method of the present invention, preferably either one or more blow tubes project radially from a rotatable shaft which is rotated, or one or more blow tubes are carried on a turntable (which can be in a horizontal, vertical or other plane), which turntable rotates so that the blow tubes follow a circular path.

In those embodiments of the present invention in which the blow tube or blow tubes rotate about an axis, which corresponds to the longitudinal axis of a rotatable shaft or corresponds to the axis of rotation of the turntable, the blow tube(s) together with the respective associated blow mould(s) preferably undergo so-called Geneva motion. In Geneva motion the body undergoing such motion follows successive cycles in each of which the body is initially at rest, then is rotated with increasing angular velocity, after which the angular velocity is decreased until the body is again at rest. Thus, the rotational speed of the body is zero for a time, after which it increases to a maximum and thereafter decreases to zero again.

In the method of the present invention, it is possible to employ so-called locked Geneva motion, in which, while the body is stationary (i.e. its rotational speed is zero), various means ensure that the body is prevented from rotating.

The advantage of using Geneva motion for the present invention is a consequence of the fact that the preform mould is fixed in the first position and of the fact that the associated blow tube and blow mould must remain at the first position for a time sufficient to enable the preform mould to close, the injection of the plastics material to take place, and the preform mould to open.

In certain embodiments it is convenient that other steps in the cycle, for example the withdrawal of the hollow body from the open blow mould, are carried out while the blow tube and associated blow mould are stationary.

In the case when the apparatus of the present invention includes a plurality of blow tubes, each having an associated blow mould, it is particularly convenient for the plurality of blow tubes to be mounted radially on a hollow, rotatable shaft, at one point along the length of the shaft and with the angle (measured in the plane perpendicular to the shaft) between adjacent pairs of tubes uniform.

Figure 9:
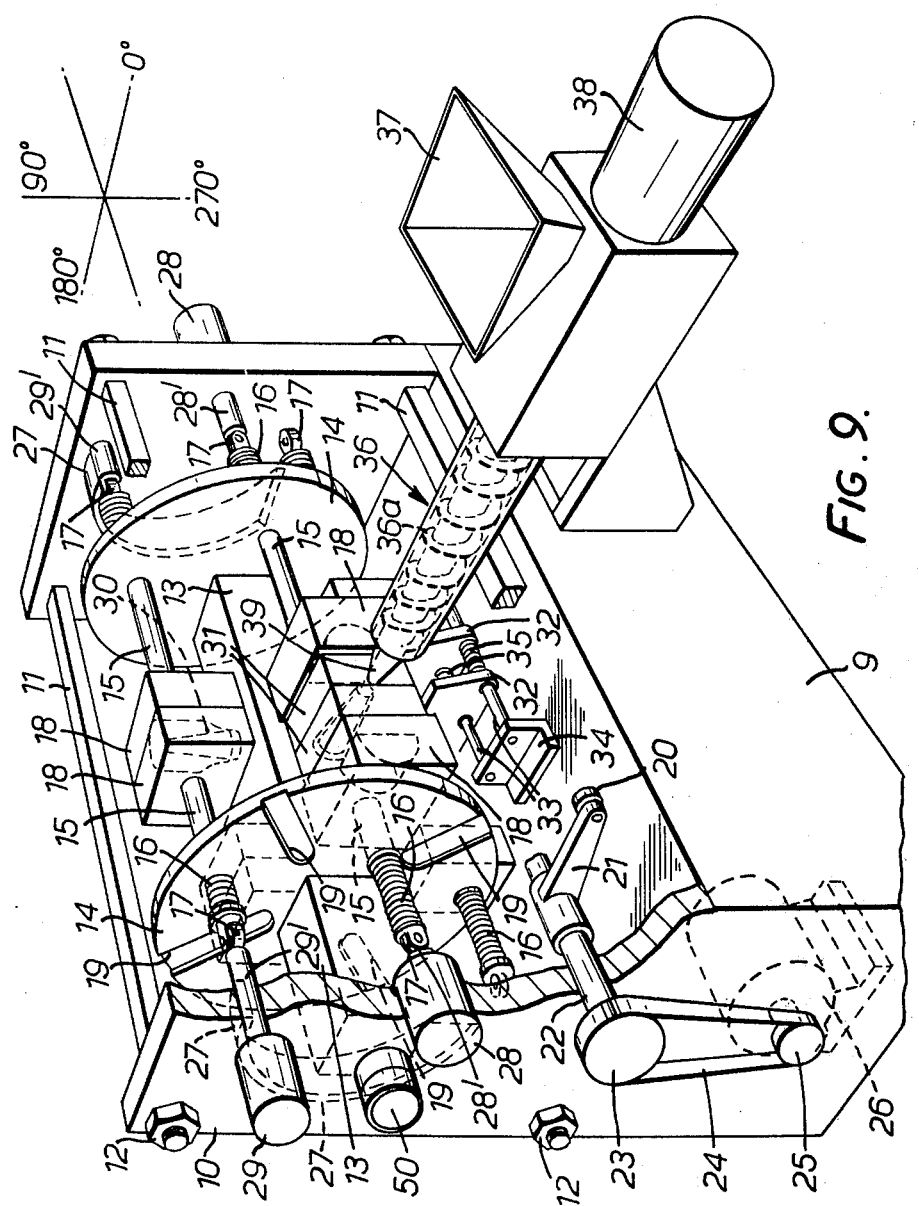
Figure 10:
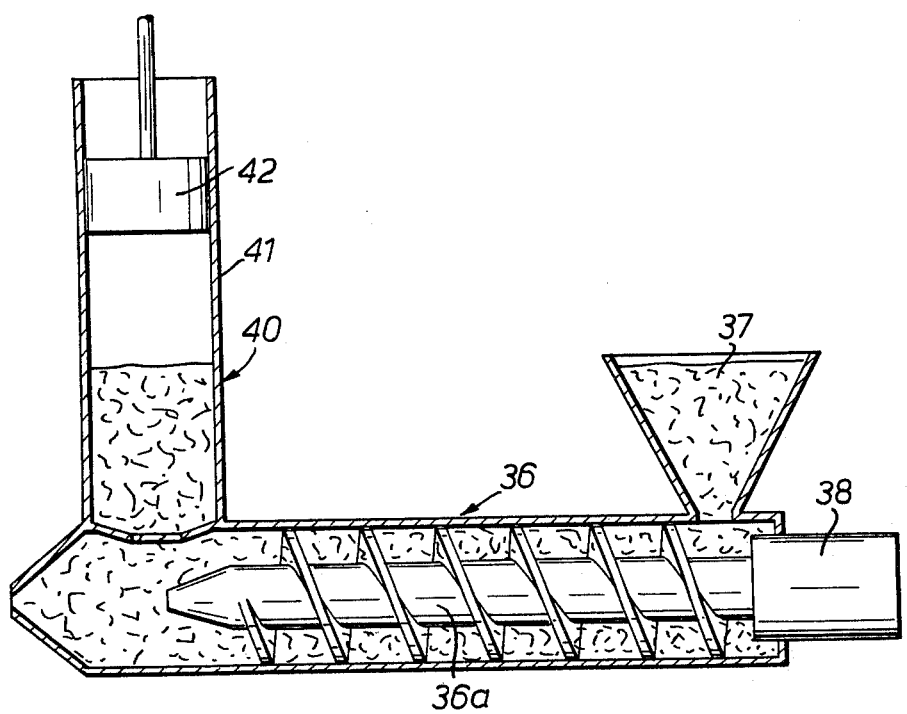

For a better understanding of the present invention and to show how the same may be carried into effect, reference will now be made, by way of example, to the accompanying drawings in which:

Each of FIGS. 1 to 8 represents a side view of a rotatable shaft carrying three blow tubes and a cross-section through parts of the mould(s) in the region of one of the blow tubes;

FIG. 9 is an isometric view of a different apparatus (partly cut away) of the present invention; and FIG. 10 is a longitudinal cross-section through a preplasticizing injection unit which can be used alternatively to that shown in FIG. 9.

In each of FIGS. 1 to 8 identical reference numerals are used to refer to identical components.

In FIG. 1 there is shown a hollow rotatable shaft 1 which carries three blow tubes 2 each provided with apertures communicating with the interior of the rotatable shaft 1. The tubes 2 are at an angle of 120° to each other.

Closed around one of the blow tubes 2 are two parts 3 and 3' of a two-part preform mould; the parts 3 and 3' are mounted respectively on supports 4 and 4' which are slidably mounted in appropriate bearings (not shown). Means (also not shown) tend to urge the supports 4 and 4' apart, thereby tending to urge apart the preform mould parts 3 and 3' respectively.

Abutting (in FIG. 1) the preform mould parts 3 and 3' are two parts 5 and 5' of a two-part blow mould; the parts 5 and 5' are mounted on the ends of pistons 6 and 6', respectively, each of which is controllably reciprocatable in a respective cylinder (not shown).

In the embodiment of the apparatus shown in FIGS. 1 to 8, the shaft 1, blow tubes 2, blow mould parts 5 and 5' and pistons 6 and 6' are arranged to undergo Geneva motion. The preform mould parts 3 and 3' and their supports 4 and 4' are not capable of undergoing any rotational motion. These components can merely move towards each other and away from each other along a straight line parallel to the longitudinal axis of shaft 1.

For the sake of simplicity, we shall consider the action involving only one of the blow tubes 2. The rotatable shaft 1 is arranged to rotate in an anti-clockwise direction (as viewed from the right-hand side of FIG. 1 when looking towards the left-hand side of FIG. 1). The anti-clockwise direction is indicated by the arrow R in FIG. 2. The Geneva motion governing the rotatable shaft 1 and the other components which rotate with the shaft 1 is such as to ensure that the particular blow tube 2, the action of which is being followed, is stationary as a position corresponding to 3 o'clock, then 11 o'clock, and then 7 o'clock, after which it next stops again at 3 o'clock.

Thus, in FIG. 1, imagine that the blow tube 2 which is surrounded by the closed preform mould parts 3 and 3', is at 3 o'clock. At this position the preform mould parts 3 and 3' are firmly held in the closed position by the action of the blow mould parts 5 and 5' which are urged towards each other by the action of the pistons 6 and 6' which are being forced towards each other in the direction indicated by the arrows F. Molten plastics material is now introduced into the preform mould at the position indicated by the arrow I, so as to form in the preform mould a preform mounted on the tube 2. The injection can be effected with, for instance, a screw preplasticizing injection unit, such as one made by Fiser S. A. of Spain.

Figure 2:
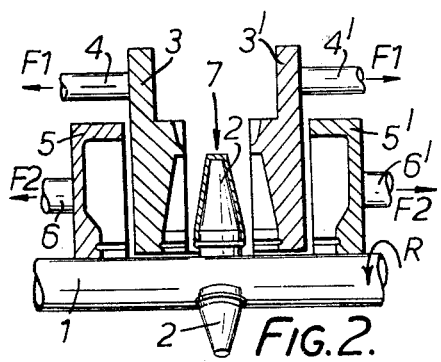

Once the injection is complete and the injection unit has withdrawn, the pistons 6 and 6' are urged apart in the direction indicated by the arrow F2 in FIG. 2 of the drawings, which allows the preform mould parts 3 and 3' and their supports 4 and 4' to open in the direction indicated by the arrow F1 in FIG. 2.

As this is happening, the rotatable shaft 1 is rotated anti-clockwise (see arrow R) so that the blow tube 2 moves from the 3 o'clock position towards the 2 o'clock position.

Figure 3:
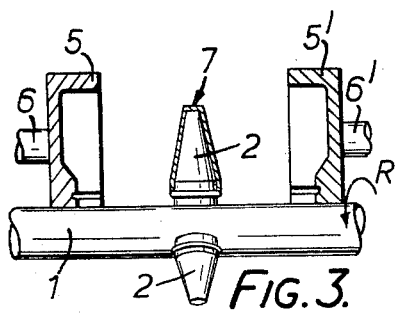

In view of the fact that the preform mould parts 3 and 3' and their supports 4 and 4' are unable to undergo rotational movement, the blow tube 2 (with the preform 7 carried thereon) and the associated blow mould parts 5 and 5' and pistons 6 and 6' soon become clear of the preform mould parts 3 and 3'; the situation now obtaining, corresponding to that in which the blow tube 2 is in the 1 o'clock position, is shown in FIG. 3. Here the shaft 1 is still rotating anti-clockwise (as viewed from the right-hand side of the figure).

Figure 4:
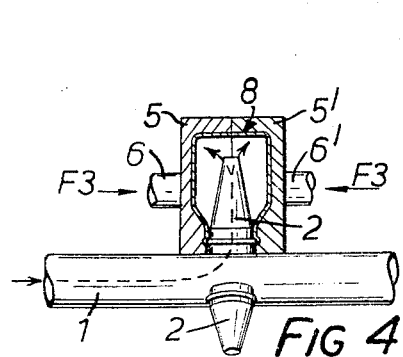
Figure 5:
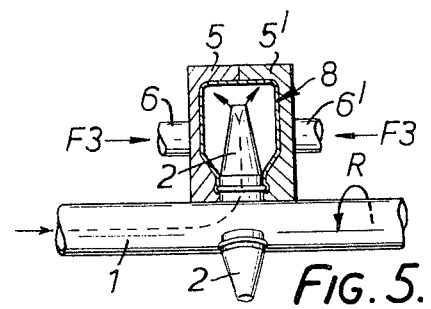

When the blow tube 2 reaches a position corresponding to 11 o'clock (as shown in FIG. 4), the shaft 1 temporarily ceases rotating. The blow mould parts 5 and 5' are urged together under the action of the pistons 6 and 6' which are forced together in the direction indicated by the arrows F3. The blow mould parts 5 and 5' are able to close completely in view of the absence of the intervening preform mould parts 3 and 3'. Air is introduced through the hollow rotatable shaft 1 and through the apertures in the blow tube 2 so as to cause the preform 7 to expand in the blow mould and to form a hollow body 8. The blowing operation can continue as the shaft 1, blow tube 2 and blow parts 5 and 5' then commence to rotate anti-clockwise (as viewed from the right), and this is shown in FIG. 5 of the drawings, which is representative of the position obtaining when the blow tube 2 has reached the 9 o'clock position.

Figure 6:
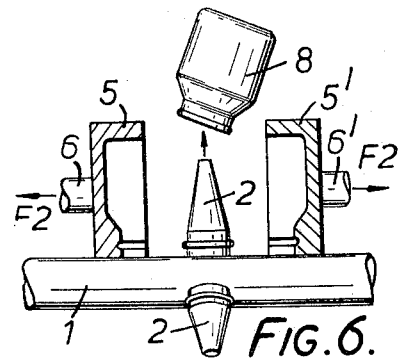

FIG. 6 represents the situation when the blow tube 2 is in the 7 o'clock position. Here the blow mould is opened under the influence of the pistons 6 and 6' moving in the direction indicated by the arrows F2. The blow mould parts 5 and 5' can be moved apart either when the shaft 1 is stationary with the blow tube 2 at the 7 o'clock position, or the opening of the blow mould can commence before the blow tube 2 reaches the 7 o'clock position and continue while the blow tube 2 is stationary at the 7 o'clock position.

The hollow body 8 can fall off the blow tube 2 when at the 7 o'clock position, under the influence of gravity.

Figure 7:
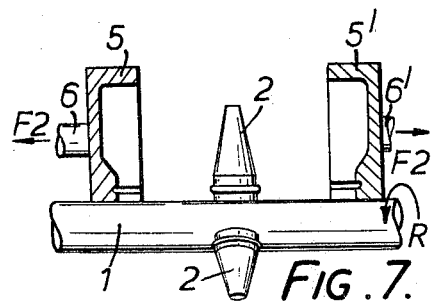
Figure 8:
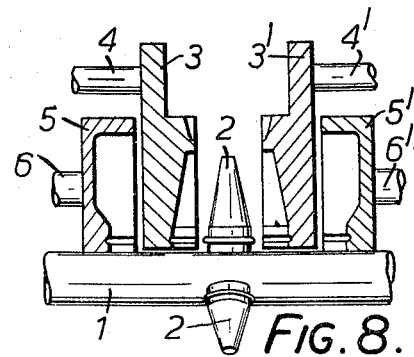

Thereafter, as shown in FIG. 7, the shaft 1, tube 2 and blow mould can continue to rotate in the anti-clockwise direction and, during the continuing rotation, the distance between the blow mould parts 5 and 5' can increase so that by the time that the blow mould parts 5 and 5' (and the blow tube 2) have reached the original starting position (i.e. 3 o'clock) the blow mould parts 5 and 5' are sufficiently far apart to pass on the outside of the preform mould parts 3 and 3', as shown in FIG. 8. At this stage the rotation again ceases and the cycle recommences as shown in FIG. 1.

Thus a complete cycle is effected during rotation of the shaft 1 through 360°. While one blow tube 2 and its blow mould parts 5 and 5' are undergoing one part of the cycle, the other blow tubes 2 and their blow mould parts 5 and 5' are undergoing other parts of the cycle.

In the apparatus described with reference to FIGS. 1 to 8 the blow mould parts 5 and 5' are, at various stages in the cycle, either urged towards each other by the action of the pistons 6 and 6' under hydraulic pressure or urged away from each other by the action of the pistons 6 and 6' under hydraulic pressure. In view of the fact that the hydraulic pressure must be maintained during certain stages when the shaft 1 is rotating, it will be appreciated that the cylinders (not shown) in which the pistons 6 and 6' reciprocate, must also undergo Geneva motion. The present invention is by no means limited to the case in which hydraulic pressure is used to maintain the blow mould parts 5 and 5' in the closed position.

An example of an alternative arrangement is that shown in FIG. 9 of the drawings where the means for controlling the blow mould parts is a combination of rams (with associated pistons) and cams.

The apparatus of FIG. 9 also differs from the apparatus of FIGS. 1 to 8 inasmuch as the rotatable shaft of the apparatus of FIG. 9 is provided with four instead of three blow tubes and is arranged to undergo Geneva motion of the type where the rotatable shaft is stationary after every 90° of rotation.

The apparatus of FIG. 9 has a base 9 provided with upwardly extending end walls 10 which are rigidly spaced apart by spacing rods 11 having screw-threaded end regions on which are mounted nuts 12. Rotatably mounted in bearings (not shown) located near the center of each of the end walls 10 is a central shaft 13 on which are rigidly carried two circular plates 14 which are spaced apart from each other and which are disposed in a plane perpendicular to the longitudinal axis of the shaft 13.

Slidably mounted in each of the circular plates 14 are four support rods 15 which extend through the circular plates 14 and are parallel to the shaft 13. Mounted on each rod 15 between the circular plate 14 and the adjacent wall 10 is a spring 16 under compression which tends to urge the rod 15 towards the adjacent wall 10.

Mounted on that end region of each rod 15 nearest to the respective end wall 10 is a roller 17, and mounted on the other end region of each rod 15 is one part 18 of a two-part blow mould which is adapted to be cooled during use of the machine.

One planar face of one of the circular plates 14 is provided with four radial grooves 19 which, with the apparatus in the position shown in FIG. 9, are directed at angles of 45°, 135°, 225° and 315° relative to the marker at the right-hand side of FIG. 9 which indicates 0°, 90°, 180° and 270°.

Positioned near that circular plate 14 provided with the grooves 19 is a roller 20 rotatably mounted on one end of an arm 21 which is rigidly mounted on a shaft 22 which carries a pulley 23 rotatable by means of an endless belt 24 drivable by another pulley 25 rotatable by an electrically operable motor 26. In use of the apparatus, the motor 26 operates at a constant speed, thereby causing the roller 20 to describe continuously a circular path. It is intended that the shaft 13 shall rotate intermittently in an anti-clockwise direction, when looking from the left-hand end of the apparatus to the right-hand end of the apparatus. It is therefore necessary that the motor 26 runs in such a direction that the shaft 22 rotates in a clockwise direction (when looking from the left-hand end of the apparatus when looking towards the right-hand end of the apparatus). When the apparatus of FIG. 9 is in use the roller 20 engages in that groove 19 directed at an angle of 225° and the rotation of the shaft 22 in a clockwise direction causes the rotation of the shaft 13 in an anti-clockwise direction. During this rotation, the roller 20 advances further into the groove 19 until the groove 19 is directed at an angle of 270° and then the roller 20 commences its withdrawal from the groove 19 and eventually leaves the groove 19 when that groove has taken up a position corresponding to an angle of 315°. Thus, in one complete rotation of the shaft 22 the shaft 13 undergoes a quarter rotation; therefore, for three-quarters of the time, the shaft 13 is stationary and, for the remaining quarter of the time, the shaft 13 is firstly increasing in angular velocity until a maximum angular velocity is obtained and then decreasing in angular velocity until it comes to rest at the new position.

Provided between each circular plate 14 and the adjacent end wall 10 is a cam 27 which has a camming effect of constant magnitude between 90° and approximately 200° but which thereafter decreases in magnitude to zero at approximately 225°.

Mounted externally on each end wall 10 are hydraulically-operable rams 28 and 29 with associated pistons 28' and 29' which extend through the end walls 10 towards the circular plates 14. The two rams 28 are mounted relative to the shaft 13 at a position corresponding to 0° and the two rams 29 are mounted relative to the shaft 13 at a position corresponding to 90°.

Midway along the rotatable shaft 13 are four blow tubes 30 extending radially from the shaft 13 in directions corresponding to 0°, 90°, 180° and 270°.

Provided adjacent the mid-point of the shaft 13, at a position corresponding to 0°, are the two parts 31 of a two-part preform mould which, in use, is adapted to be heated in one region and cooled in another region.

The two preform mould parts 31 are mounted on supports 32 which are slidably mounted on rails 33 of which the end regions are secured in brackets 34 mounted on the base 9. Mounted on the rails 33 between the supports 32 are springs 35 under compression which tend to urge apart the supports 32 and hence the preform mould parts 31.

It will be appreciated that the only movement which the preform mould parts 31 can undergo is a reciprocatable motion allowing the preform mould to open and close. Thus, only the blow moulds undergo rotation in accordance with the Geneva motion.

At a position corresponding to 0° is provided a reciprocatable preplasticizing injection unit generally indicated by the reference numeral 36, which unit is fed with plasticizable material through a hopper 37 and powered by appropriate power means 38. That end of the injection unit 36 nearest the preform mould parts 31 terminates in a nozzle 39 which is reciprocatable along the longitudinal axis of the injection unit which is capable of periodically injecting molten plastics materials into the preform mould.

On each end of the rotatable shaft 13 are rotary unions 50, through which various services, e.g. air, water and hot oil, can be fed to the blow tubes and blow mould parts.

The blow moulds are water-cooled; the preform mould is heated in one region and cooled at another region; the blow tubes 30 are heated with oil and are valved for air supply; and the hydraulic functions and service controls are operated by cams (not shown) on the shaft 22.

The method of operating the apparatus of FIG. 9 will now be described.

For the sake of simplicity we shall describe the operation in respect of only one of the four blow tubes 30, during a complete revolution of the shaft 13. It will be appreciated that the action occurring in the region of one blow tube 30 is repeated in the region of the next blow tube 30 when said next blow tube has advanced to the former position of the said one blow tube.

We shall consider the action in the region of that blow tube 30 which is shown in FIG. 9 at the 0° position. At the 0° position the rams 28 are actuated which cause the pistons 28' to move towards the center of the apparatus. The leading end of the pistons 28' abut the nearby rollers 17 and cause the rods 15 and the associated blow mould parts 18 to move towards each other; this causes the preform mould parts 31 to be forced together around the blow tube 30, thereby closing the preform mould. The preform mould parts are heated and molten plastics material is introduced into the mould via the nozzle 39 of the injection unit 36, which has advanced towards the closed preform mould. As soon as the preform mould is full of plastics material, the nozzle 39 of the injection unit 36 is retracted.

There is thus formed in the preform mould a preform around the blow tube 30.

The pistons 28' of the rams 28 are then retracted into the ram 28 and the blow mould parts 18 move away from each other under the action of the spring 16. This allows the preform mould parts 31 to move away from each other under the action of the springs 35.

At this stage the roller 20 enters the groove 19 which is directed at an angle of 225° and rotation of the shaft 22 causes rotation of the shaft 13 through 90°, so that the blow tube 30, the preform carried on the blow tube 30, and the associated blow mould parts 18 are now at the top of the apparatus; the roller 20 departs from the groove 19 at this time. At this stage the rams 29 are actuated so as to cause the pistons 29' to move towards the center of the apparatus. The leading end regions of the pistons 29' force the rollers towards the center of the apparatus. This causes the rods 15 to force the blow mould parts 18 together around the preform on the blow tube 30. As soon as the blow mould is closed, air is introduced into the blow tube 30 so as to cause the preform to expand and form a hollow body within the blow mould.

When the blow mould under consideration has reached the position corresponding to 90°, the next blow mould has moved in position around the preform mould, so that when expansion of the preform in the first blow mould is taking place at the position corresponding to 90°, the injection of the molten plastics material is taking place in the by now closed preform mould at the position corresponding to 0°.

The roller 20 then enters the next groove 19 and causes rotation of the shaft 13, the circular plates 14, the blow tubes 30 and the blow mould parts 18, through another 90°. The rollers 17 roll off the leading ends of the pistons 29', but the rollers 17 are prevented from moving apart under the action of the springs 16 because the rollers move directly onto regions of maximum effectiveness of the cams 27, so that the blow mould is kept closed during rotation of the blow mould from the position corresponding to 90° through the next stationary stage 180° until approximately 200°. The blowing operation of the preform ceases at the end of the stay of the blow mould at the position corresponding to 180°. Beyond 200° the rollers 17 follow the diverging, falling cams 27, which allows the blow mould under consideration to open. With the blow mould open and stationary at 270°, a short burst of air is passed through the blow tube 30 to assist in the withdrawal of the hollow body from the blow tube. Mechanical means (not shown) also assist in the withdrawal of the hollow body from the blow mould.

At the end of the stay of the blow mould at the position corresponding to 270° the blow mould is rotated through 90° to its starting position. Because the blow mould is open, the blow mould parts 18 take up a position around the open preform mould. Then the cycle recommences with the actuation of the rams 28 and the consequent closing of the preform mould by the action of the blow mould parts 18.

In the embodiment illustrated in FIG. 9 of the drawings, the injection unit 36 is positioned at the side of the apparatus, but improved operating results can be achieved by positioning the injection unit 36 at the top or bottom of the apparatus, i.e. at positions corresponding to 90° to 270° on the marker in FIG. 9, with the other components of the apparatus moved through the same number of degrees. Alternatively the injection unit 36 can be at some intermediate position, if desired.

Finally referring to FIG. 10 of the drawings, there is shown an alternative form of injection unit to that shown in FIG. 9 of the drawings. With a conventional type of injection unit of the type shown in FIG. 9, the size of the preform is determined by the amount of material which can be plasticized in the preplasticizing section of the injection unit. It is frequently desired to produce blow moulded products from preforms comprising a greater volume of plastics material than can be accommodated by the preplasticizing section of a conventional injection unit. This difficulty can be overcome by use of a preplasticizing injection unit as shown in FIG. 10 which comprises an accumulator 40 branched off from the downstream section of the preplasticizing injection unit 36 just before the nozzle 39. The accumulator 40 comprises a casing 41 housing a piston 42 having means (not shown) for effecting the displacement thereof in the casing 41.

The operation of the modified form of preplasticizing unit will now be described.

As hereinabove indicated in connection with FIG. 9, in conventional use a preplasticizing injection unit 36 is reciprocatably operated so that as plasticizable material is fed through a hopper 37 thereinto, the injection unit is simultaneously rotated to achieve plasticization and driven towards the preform mould in which the preform is to be produced. When the preplasticizing injection unit is constructed as shown in FIG. 10 and the quantity of material which can be plasticized therein is sufficient to forming the premould, the preplasticizing unit will be operated in like manner. However, when the quantity of plastics material required for forming the premould is a multiple of the capacity of the injection unit, the screw of the injection unit will be rotated while plasticizable material is fed thereto but will not be conveyed towards the nozzle. Hence, plasticized material will pass into the accumulator 40 and plasticization in this manner will be continued until sufficient material has entered the accumulator. At this stage, the ram or piston 42 will be brought to act upon the plasticized material and force it through the injection nozzle 39 into the premould. The volume of material accommodated by the accumulator can thus be equal to or larger than the maximum shot of the injection unit, for example three times larger than the maximum shot of the injection unit.

As an alternative to using an accummulator as shown in FIG. 10 to increase the bulk of material injected into the premould, there can be used a plurality of preplasticizing injection units which allow different batches of material to be coextruded or coinjected into the premould. Such a method of operation is of particular advantage when it is desired that the premould and hence the final blow moulded article should comprise layers formed of different materials and/or of different colour as may be required for the purpose of protecting the interior of the blow moulded article against corrosion by the intended contents thereof, or for aesthetic reasons.

In FIGS. 9 and 10, the screw of the preplasticising injection unit 36 is designated by the reference numeral 36*a*.

I claim:

1. An apparatus for injection blow moulding, which apparatus includes:

an openable and closable preform mould provided at a first position;

a blow tube and an associated, openable and closable blow mould, the blow tube and associated blow mould being movable together between (a) a first position in which the preform mould is intermediate the blow tube and the open blow mould and (b) a subsequent position where the blow tube and blow mould are clear of the preform mould;

means for moving the blow tube and associated blow mould from the first position to a subsequent position, and then again to the first position, said moving means including means connected to the blow mould;

means for closing the preform mould around the blow tube when the blow tube is in the first position, said preform mould closing means including the blow mould, and means, connected to the preform mould, for subsequently opening the preform mould;

means, in the region of the first position, for injecting molten plastics material into the preform mould when the preform mould is closed in the first position around the blow tube; whereby a preform can be formed in the preform mould;

means for closing the blow mould around the blow tube when the blow mould is in a subsequent position, and for subsequently opening the blow mould, said means for closing and opening the blow mould including means joinable to the blow mould; and means, coupled to the blow tube, for blowing a fluid medium via the blow tube into the closed blow mould when the blow mould is in a subsequent position, whereby a hollow body can be formed by expansion of the preform.

2. An apparatus according to claim 1, which further includes a plurality of blow tubes each having an associated blow mould, wherein the plurality of blow tubes and their respective blow moulds are carried on a rotatable member which undergoes rotation in one direction only, said means for moving including said rotatable member.

3. An apparatus according to claim 2, wherein said rotatable member includes an elongated shaft, wherein the blow tubes project radially from the rotatable shaft and the blow moulds each include two associated parts, the associated two-part blow moulds being opened and closed by moving the blow mould parts in a direction parallel to the longitudinal axis of the rotatable shaft, wherein the preform mould includes two associated parts, the two-part preform mould being opened and closed by moving the parts of the preform mould in a direction parallel to the longitudinal axis of the rotatable shaft, and the means for injecting molten plastics material includes means reciprocatable radially with respect to the rotatable shaft.

4. An apparatus according to claim 2, wherein the blow tubes are disposed parallel to, and displaced from, the axis of rotation of the rotatable member, the blow moulds each include two associated parts, the two-part blow mould can be opened and closed by moving the parts radially with respect to the axis of rotation, the preform mould includes two associated parts, the two-part preform mould can be opened and closed by moving its parts radially with respect to the axis of rotation, and the means for injecting molten plastics material is reciprocatable along a line of action, parallel to the axis of rotation.

5. An apparatus according to claim 2, wherein said means for moving includes means for imparting Geneva motion to the rotatable member.

6. An apparatus according to claim 1, wherein the blow mould includes two associated parts and the preform mould includes two associated parts, said preform mould opening means includes means tending to urge the preform mould parts apart, the means for opening the blow mould includes means tending to urge the blow mould parts apart, and the means for closing the blow mould includes (i) hydraulically actuatable pistons and (ii) a cam and an associated ram.

7. An apparatus according to claim 1, wherein the means for injecting molten plastics material has its axis lying in a plane passing vertically through the center of the apparatus.

8. An apparatus according to claim 1, wherein the means for injecting molten plastics material comprises a plasticizing screw, an accumulator located downstream of the screw and having a storage capacity for material plasticized by the screw, the storage capacity of the accumulator being equal to or greater than the plasticizing capacity of the screw, and wherein the accumulator comprises means for injecting accumulated plasticized material therefrom through a nozzle of the injecting means.

9. An apparatus for injection blow moulding, which apparatus includes:

an openable and closable preform mould provided at a first position;

a blow tube and an associated, openable and closable blow mould, the blow tube and associated blow mould being movable together between (a) a first position in which the preform mould is intermediate the blow tube and the open blow mould and (b) a subsequent position where the blow tube and blow mould are clear of the preform mould;

means for moving the blow tube and associated blow mould from the first position to a subsequent position, and then again to the first position, said moving means including means connected to the blow mould;

means for closing the preform mould around the blow tube when the blow tube is in the first position, and means, connected to the preform mould, for subsequently opening the preform mould;

means, in the region of the first position, for injecting molten plastics material into the preform mould when the preform mould is closed in the first position around the blow tube; whereby a preform can be formed in the preform mould;

means for closing the blow mould around the blow tube when the blow mould is in a subsequent position, and for subsequently opening the blow mould, said means for closing and opening the blow mould including means joinable to the blow mould; and means, coupled to the blow tube, for blowing a fluid medium via the blow tube into the closed blow mould when the blow mould is in a subsequent position, whereby a hollow body can be formed by expansion of the preform.

* * * * *